(12) United States Patent
Petschulat et al.

(10) Patent No.: US 8,577,862 B2
(45) Date of Patent: Nov. 5, 2013

(54) ANSWER-AUGMENTED QUERY SUGGESTION

(75) Inventors: Stephen Petschulat, Coquitlam (CA); Luke Kysow, Vancouver (CA)

(73) Assignee: Business Objects Software Limited, Dublin (IE)

( * ) Notice: Subject to any disclaimer, the term of this patent is extended or adjusted under 35 U.S.C. 154(b) by 74 days.

(21) Appl. No.: 13/276,622

(22) Filed: Oct. 19, 2011

(65) Prior Publication Data

US 2013/0103710 A1    Apr. 25, 2013

(51) Int. Cl.
*G06F 17/30*    (2006.01)

(52) U.S. Cl.
USPC ........... 707/706; 707/722; 707/736; 707/758; 707/781; 707/791

(58) Field of Classification Search
USPC ................................................. 707/600–899
See application file for complete search history.

(56) References Cited

U.S. PATENT DOCUMENTS

2011/0202520 A1* 8/2011 Teran et al. .................. 707/708

FOREIGN PATENT DOCUMENTS

| WO | 01/41002 A1 | 6/2001 |
|---|---|---|
| WO | 2011/024064 A2 | 3/2011 |
| WO | 2011/024064 A3 | 3/2011 |

OTHER PUBLICATIONS

Nodira Khoussainova et al., "SnipSuggest: Context-Aware Autocompletion for SQL", Proceedings of the VLDB Endowment, vol. 4, No. 1, Jan. 1, 2010, XP055054567, ISSN: 2150-8097 (pp. 22-33, 12 pages total).

Gloria Chatzopoulou et al., "The QueRIE system for Personalized Query Recommendations", XP007921591, vol. 34, No. 2, Jan. 1, 2011, (pp. 1-6, 6 pages total).

Arnab Nandi et al., "Guided Interaction: Rethinking the Query-Result Paradigm", Proceedings of the VlDB Endowment, vol. 4, No. 12, Jan. 1, 2011, XP055054575, ISSN: 2150-8097, 4pgs.

Communication: "European Search Report", dated Mar. 18, 2013, European Patent Office, 7pgs.

* cited by examiner

*Primary Examiner* — Isaac M Woo
(74) *Attorney, Agent, or Firm* — Buckley, Maschoff & Talwalkar LLC (57) ABSTRACT

A system includes reception of a partial query, determination of one or more previously-selected query phrases based on the partial query, determination, for each of the one or more previously-selected query phrases, of a dataset of a data source, determination, for each dataset determined for each of the one or more previously-selected query phrases, of a plurality of columns, and presentation, for each of the one or more previously-selected query phrases, of the previously-selected query phrase, the dataset determined for the previously-selected query phrase, and the columns determined for the dataset.

24 Claims, 8 Drawing Sheets

FIG. 5 us revenue 2004

Matching: ○ Country: US   ◑ Year: FY2004   Σ Revenue

Add Columns ⊖   Resort   Sales Person                    ← 331

| Country | Month | Number of Guests | Year | Revenue |
|---------|-------|------------------|------|---------|
| US | Apr | 4 | FY2004 | 10976 |
| US | Aug | 4 | FY2004 | 4400 |
| US | Aug | 6 | FY2004 | 4680 |
| US | Aug | 4 | FY2004 | 4700 |
| US | Dec | 8 | FY2004 | 10704 |

Copy to Clipboard — 332

330

Other Results:

Columns Sales revenue, Store name and State in table e-Fashion Sales   (Preview) (Show)
Columns Country, Deaths and Year in table Country Malaria Deaths   (Preview) (Show)
Columns Country and Population in table Country Populations   (Preview) (Show)

ANSWER-AUGMENTED QUERY SUGGESTION

BACKGROUND

Techniques for searching large data repositories have become commonplace. For example, according to conventional search modalities, a user types a search query composed of one or more search terms, a search engine identifies relevant data from a data repository data based on the search query and on a searching algorithm, and the identified data is returned to the user as search results.

Some conventional searching systems monitor the characters typed by the user and contemporaneously suggest search terms based on the characters. Typically, the suggested search terms are generated by querying a remote database of previously-entered queries while the characters are being typed and/or by comparing the typed characters to search queries which have been previously input by the user and which are stored locally.

Corporate enterprise software systems receive, generate, and store data related to many aspects of a business enterprise. In some implementations, this data may relate to marketing, sales, customer relations, supplier relations, inventory, human resources, and/or finances. Analytical tools, such as reporting systems, are commonly used to present such enterprise data to users in useful formats.

The suggestion-based search systems mentioned above are unsuited for the corporate scenario, in which a relatively small number of users employ a relatively small number of terms, most of which have specialized meaning. Due to this specialization, one usage of a term cannot easily be distinguished from another without knowledge of the usage context. The context is often only apparent upon review of the content corresponding to each usage.

For example, typing "cust" into a search box may result in the query suggestions: customer sales; customer issues; customers requesting upgrades; and customer list. However, the term "customer sales" holds a subtly different meaning for people in different departments (e.g., marketing, sales, finance, and engineering). Moreover, a typical enterprise environment may provide many information sources containing the term "customer sales", including reports, documents, presentations, and database tables, but each individual information source may be only relevant to a single department. For example, the finance department may only be interested in search results including financial reports and databases, and not in search results including sales funnel information or engineering studies on product usage statistics.

In order to access desired information sources, the user can execute the suggested query, receive search results including a list of information sources, examine each information source, and select the ones that are semantically relevant to the user's task. Such an operation is inefficient, and runs contrary to the time-saving purpose of query suggestion.

What is needed is a query suggestion system which efficiently allows a user to distinguish between suggested queries based on the stored data of an enterprise system.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
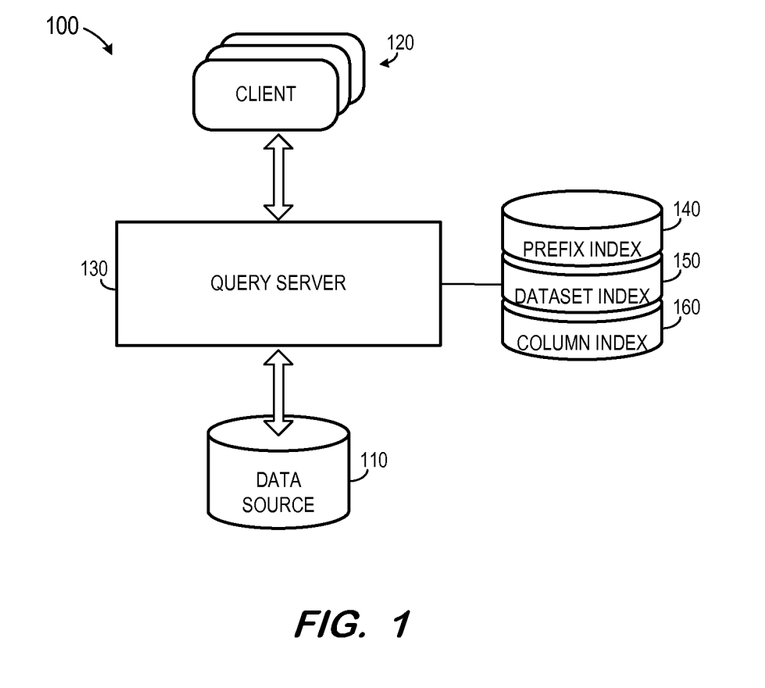
FIG. 1 is a block diagram of a system according to some embodiments.

FIG. 1 is a block diagram of system 100 according to some embodiments. System 100 includes data source 110, clients 120, and query server 130. Data source 110 may comprise any query-responsive data source or sources that are or become known, including but not limited to a structured-query language (SQL) relational database management system. Data source 110 may comprise a relational database, a multi-dimensional database, an eXtendable Markup Language (XML) document, or any other data storage system storing structured and/or unstructured data. The data of data source 110 may be distributed among several relational databases, dimensional databases, and/or other data sources. Embodiments are not limited to any number or types of data sources. For example, data source 110 may comprise one or more OnLine Analytical Processing (OLAP) databases, spreadsheets, text documents, presentations, etc. Data source 110 may comprise a physical and/or an in-memory (e.g., in Random Access Memory) database, or any other type of data source that is or becomes known. The data stored in data source 110 may be received from disparate sources (not shown).

To provide economies of scale, data source 110 may include data of more than one customer (i.e., tenant). In such an implementation, query server 130 includes mechanisms to ensure that a tenant accesses only the data that the tenant is authorized to access. Additionally, the data of data source 110 may be indexed and/or selectively replicated in an index to allow fast searching and retrieval thereof.

Query server 130 generally provides data of data source 110 to reporting clients 120. The data may be provided based on semantic layer metadata, which defines objects that are in turn mapped to logical entities of data source 110. The metadata may be stored in data source 110 and/or a separate repository (not shown).

For example, enterprise systems may interact with a set of abstract entities known as business objects. Each business object associates one or more physical entities (e.g., a physical database table, associated columns of one or more database tables) of one or more enterprise data sources with user-friendly names. The user-friendly names may represent business entities, such as customers, time periods, financial figures, etc. Business objects may be classified as dimensions along which one may want to perform an analysis or report (e.g., Year, Country, Product), details (e.g., additional information on dimensions), and measures (e.g., Sales, Profit) whose values can be determined for a given combination of dimension values. In order to effectively search an enterprise system, a user would prefer to use these user-friendly names instead of references to specific physical entities of the data sources.

According to one example, query server 130 receives a query from one of clients 120. The query is filtered on one or more objects defined by the metadata. Query server 130 generates an SQL script based on the query and on the data sources which are associated with the one or more objects as defined by the metadata. The SQL script is forwarded to data source 110, which executes the query and returns a dataset based on the SQL script. Query server 130 then returns the dataset to the client 120.

Each of clients 120 may comprise one or more devices executing program code of a software application for presenting user interfaces to allow interaction with query server 130. Presentation of a user interface may comprise any degree or type of rendering, depending on the type of user interface code generated by query server 130. For example, clients 120 may execute a Web Browser to receive a Web page (e.g., in HTML format) from query server 130, and may render and present the Web page according to known protocols. Clients 120 may also or alternatively present user interfaces by executing a standalone executable file (e.g., an .exe file) or code (e.g., a JAVA applet) within a virtual machine. System 100 may include any number of clients 120 of one or more types according to some embodiments.

System 100 also includes indices 140 through 160. Indices 140 through 160 include information to facilitate the generation of query suggestions according to some embodiments. Prefix index 140 associates previously-input "query phrases" with their substrings and with an indicator of their popularity (e.g., 'substring'=>'query phrase', popularity indicator). For example, if three searches for the query phrase "q1 sales" were previously initiated, prefix index 140 may include the following corresponding entries:

'q' = >'q1 sales', 3

'q1' = >'q1 sales', 3

...

'q1 sale' = >'q1 sales', 3

'q1 sale' = >'q1 sales', 3

Dataset index 150 may store information indicating the popularity of a particular dataset with respect to a query phrase. For example, if results from a SalesDB dataset are "used" (e.g., copied and pasted, workflowed to another tool, etc.) five times after searching for 'q1 sales' and results from a CustomerDB dataset are used two times after searching for 'q1 sales', the following structure is present in dataset index 150: 'q1 sales'=>{'SalesDB'=>5, 'CustomerDB'=>2}.

Column index 160 tracks the usage of columns of each dataset within returned search results. Each time a column of a dataset is added or deleted from presented search results, the popularity of the column is incremented or decremented for that dataset. In a particular example, it is assumed that ten searches of the SalesDB dataset were conducted, the column Revenue was added to the resulting search results five times and removed one time, and the column Salesperson was removed from the search results two times. Column index 160 may therefore include the record: 'SalesDB'=>{'Revenue'=>4, Salesperson=>-2}.

A detailed description of the usage of indices 140 through 160 according to some embodiments will be provided below.

Figure 2:
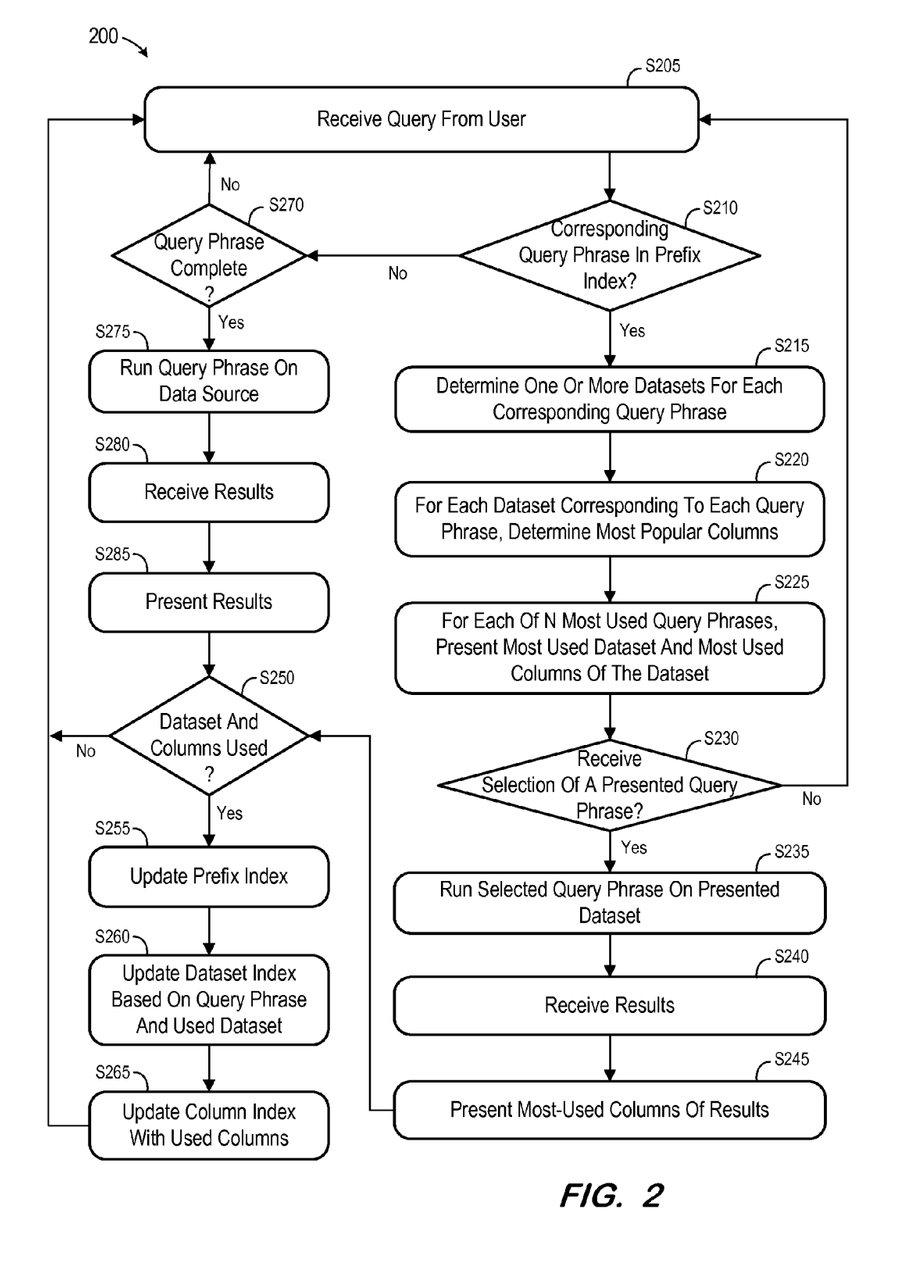
FIG. 2 illustrates a flow diagram of a process according to some embodiments.

FIG. 2 comprises a flow diagram of process 200 according to some embodiments. In some embodiments, various hardware elements of query server 110 execute program code to perform process 200. Process 200 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format.

In some embodiments, hard-wired circuitry may be used in place of, or in combination with, program code for implementation of processes according to some embodiments. Embodiments are therefore not limited to any specific combination of hardware and software.

Figure 3:
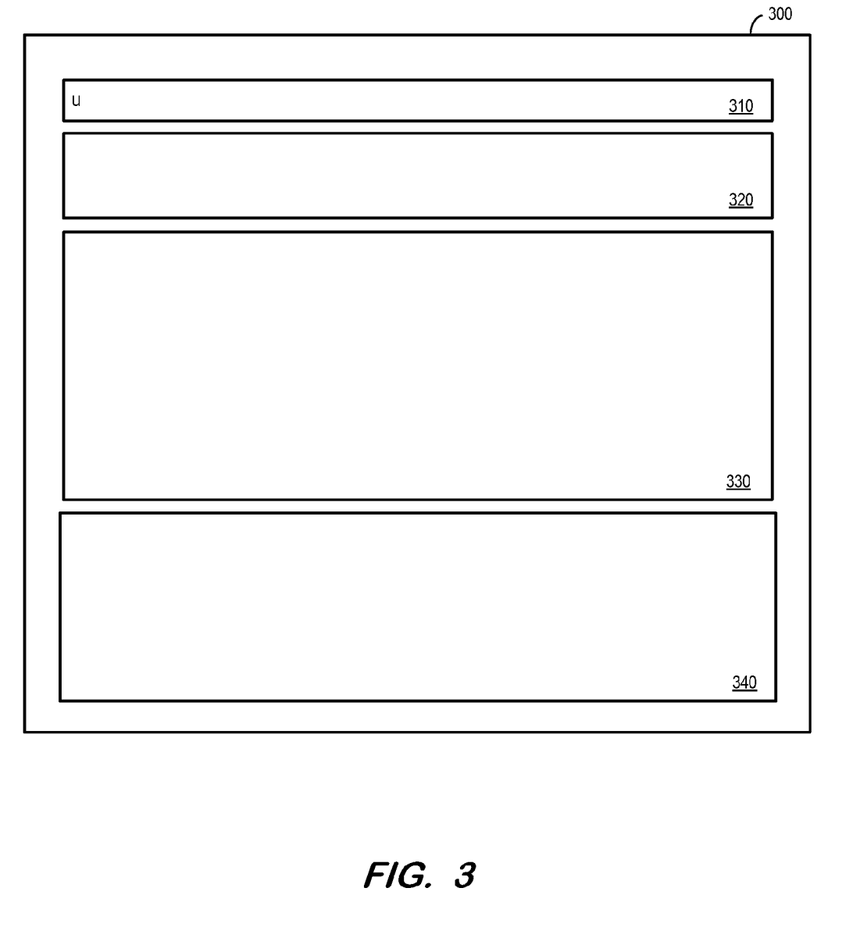
FIGS. 3 through 7 comprise views of a search interface according to some embodiments.

Initially, at S205, a partial query is received from a user. The partial query may include any number of characters. FIG. 3 illustrates interface 300 to receive a partial query from a user in one embodiment of S205. Interface 300 may be a Web page provided by query server 130 in response to a request from a client 120. Client 120 may execute any client application to display interface 300, which is not limited to Web-based formats.

Interface 300 includes input field 310, in which the user has entered the letter "u". Continuing with process 200, it is determined at S210 whether a corresponding query phrase is stored in prefix index 140. According to the present example, it will be assumed that prefix index 140 associates the index 'u.' with the query phrases 'us revenue 2004' and 'united states q sales'. Accordingly, flow proceeds from S210 to S215.

At S215, one or more datasets are determined for each query phrase identified at S210. As mentioned above, dataset index 150 associates one or more datasets with previously-input query phrases. Accordingly, one or more datasets for each query phrase (i.e., 'us revenue 2004' and 'united states q sales') may be identified from dataset index 150 at S215. Next, the most popular columns of each of the identified datasets are identified at S220. These columns may be determined based on column index 160, which specifies, for each dataset, an indication of column popularity. The "most popular" columns of a dataset may be evaluated in any suitable manner, such as by identifying the columns associated with the X (e.g., three) largest popularity indicators in index 160, or by identifying all columns associated popularity indicators greater than a predetermined number.

Therefore, at the conclusion of S220, one or more query phrases have been determined. For each query phrase, one or more datasets have been determined. Moreover, the most popular columns have been determined for each dataset of each query phrase. In some embodiments, the user may then be presented with each identified query phrase, a dataset determined for that query phrase and the columns determined for that dataset. If more than one dataset was determined for a query phrase, then the query phrase is additionally presented along with each other dataset and the columns determined for that dataset.

The foregoing may provide too many and/or confusing choices to the user. Any subset of determined query phrases/datasets/columns may be presented to the user after S220. For example, according to process 200, the user is presented at S225 with each of the N (e.g., three) most-used query phrases. The N most-used of the determined query phrases may be determined from the popularity indicator associated with each query phrase in prefix index 140. For each of the presented N most-used query phrases, also presented at S225 are a most-used dataset and the most-used columns of that dataset, which are determined, respectively, based on the query-specific popularity indicator of dataset index 150 and the dataset-specific popularity indicator of column index 160. In some embodiments, social network information may also influence the determination of popular columns, most-used query phrases and/or datasets. For example, query phrases/data sources/columns used by a user's colleagues or friends may be given a greater weight during these determinations.

Figure 4:
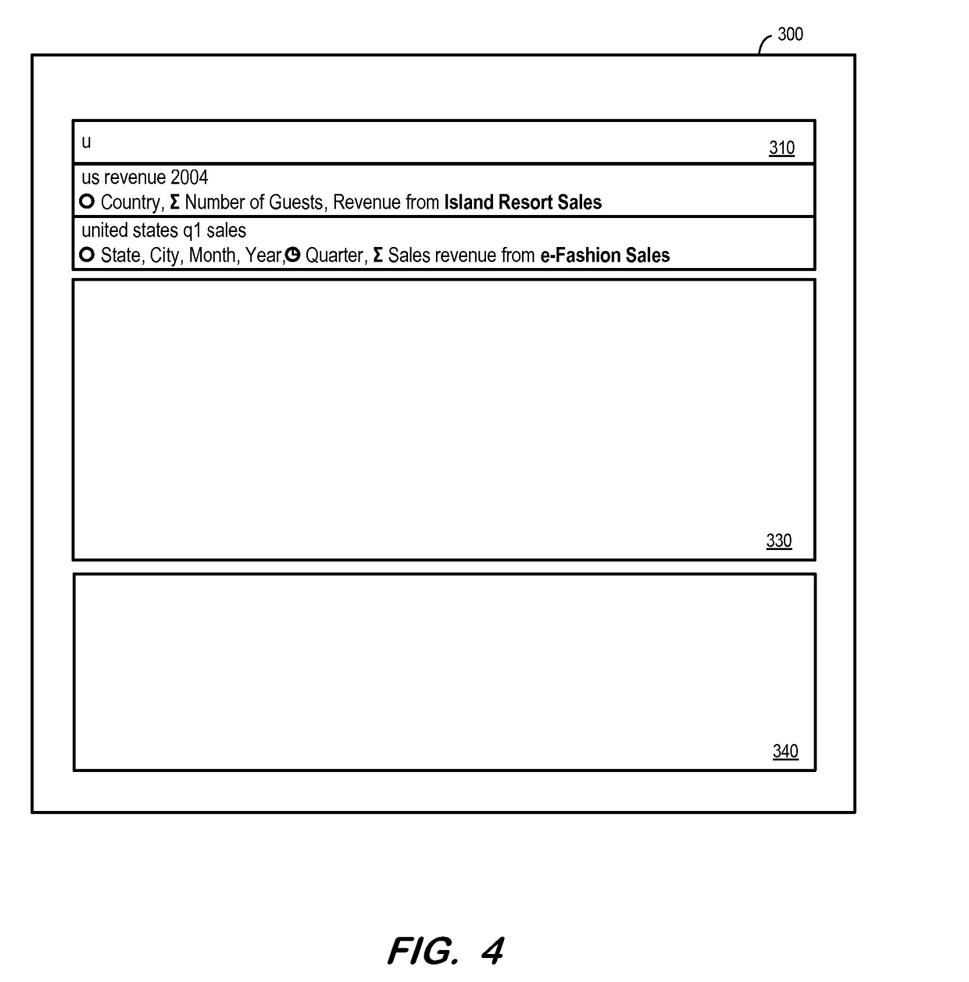

FIG. 4 illustrates interface 300 after S225 according to some embodiments. Drop-down fields 312 and 314 present the N most-used query phrases associated with the partial query "u" entered into field 310. Each query phrase is presented in conjunction with a most-used dataset (i.e., Island Resort Sales, e-Fashion Sales) and most-used columns of the dataset (i.e., (Country, Number of Guests, Revenue) and (State, City, Month, Year, Quarter, Sales Revenue)).

Advantageously, each query phrase is presented in conjunction with contextually-relevant metadata which corresponds to the results that will be returned from the query phrase. Such metadata therefore assists the user in disambiguating between similar query phrases and more efficiently determining the most suitable query phrase for the task at hand.

The user may select one of the presented query phrases at S230. Alternatively, the user may type one or more additional letters into field 310, in which case flow returns to S205 and continues as described above. As more letters are typed, the number of corresponding query phrases determined at S210 may decrease, and therefore the query phrases, datasets and columns presented at S225 may change.

If a presented query phrase is selected at S230, the selected query phrase is run on the associated dataset at S235. For example, if the user selects field 312 of FIG. 4, the query phrase "us revenue 2004" is run on the dataset "Island Resort Sales". According to some embodiments, and as described above, query server 120 creates an SQL script based on the query phrase and on metadata of system 100, and forwards the SQL script to data source 110 for execution.

Results of the query are received at S240, and the most-used columns of the results (as determined at S220) are presented to the user at S245. Some embodiments may present additional columns (e.g., columns which are not determined to be most-used but which include one of the search terms, and/or columns associated with a popularity level which is greater than a predetermined amount) or may omit one or more of the most-used columns (e.g., most-used columns associated with a popularity level which is less than a predetermined amount).

Figure 5:
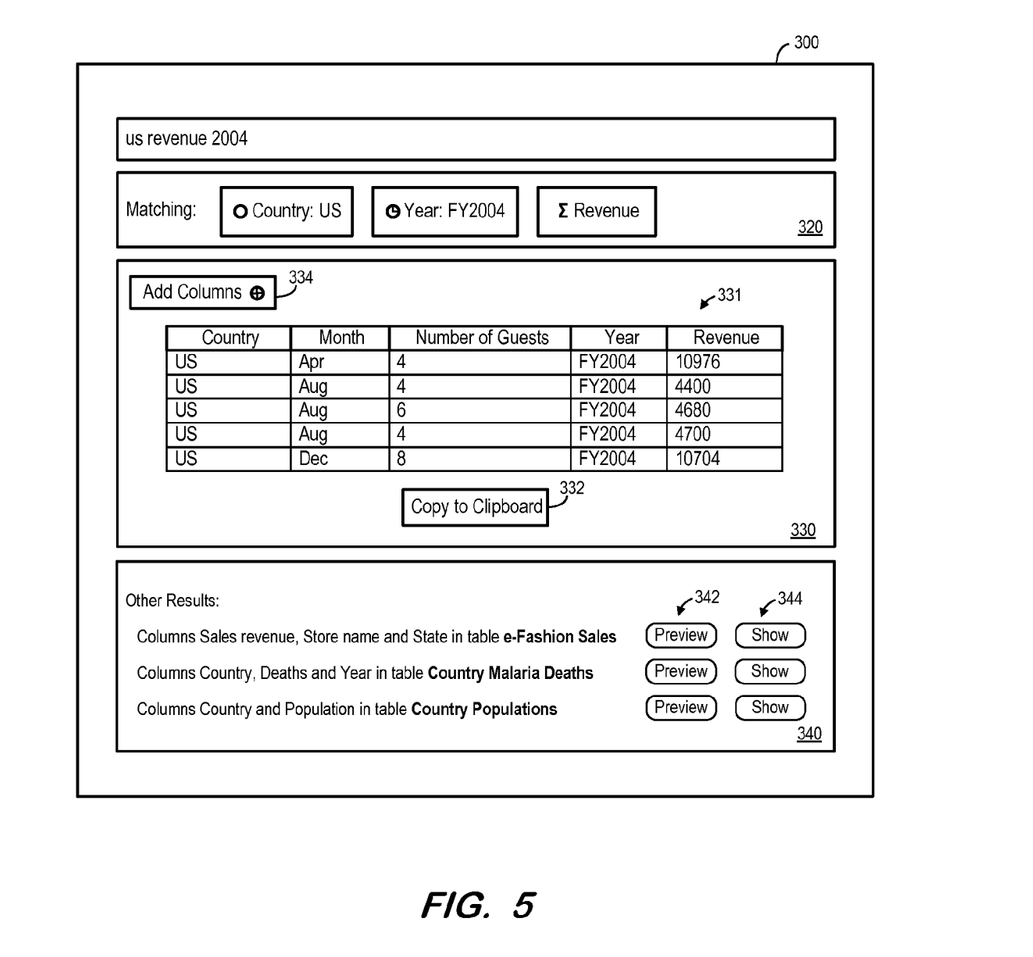

FIG. 5 illustrates interface 300 at S245 according to some embodiments. Area 320 indicates columns of the results which are associated one or more terms of the search query, either because results within the column include one or more terms of the search query or because the name of the column is similar (or identical) to one or more terms of the search query.

Area 330 shows results 331 received from data source 110. Results 331 include only the columns which were determined for presentation at S245. According to the illustrated embodiment, area 340 presents other datasets and their associated columns which were determined at S215 and S220 for the selected query phrase. Area 340 also includes controls 342 and 344 to allow the user to search one of the presented datasets and receive presented results as described with respect to S235 through S245. For example, Preview controls 342 may cause execution of a limited search of the corresponding dataset at S235, while Show controls 344 may initiate a more complete search.

The user may select Copy to Clipboard control 332 to copy results 331 to a software clipboard for later use (e.g., in a spreadsheet, a text document, a presentation, etc.). This action may be considered a "use" of the dataset and presented columns as described above. Flow therefore proceeds from S250 to S255, at which prefix index 140 is updated to increment the popularity indicator associated with the query phrase. For example:

'u' => 'us revenue 2004', 5 is updated to 'u' => 'us revenue 2004', 6

'us' => 'us revenue 2004', 5 is updated to 'us' => 'us revenue 2004', 6

...

'us revenue 200' => 'us revenue 2004',

5 is updated to 'us revenue 200' => 'us revenue 2004', 6

'us revenue 2004' => 'us revenue 2004',

5 is updated to 'us revenue 2004' => 'us revenue 2004', 6

Similarly, dataset index 150 is updated to increment the popularity indicator associated with the used dataset and the query phrase. According to an embodiment of the present example, 'us revenue 2004'=>{'SalesDB'=>5, 'Island Resort Sales'=>6} may be updated to 'us revenue 2004'=>{'SalesDB'=>5, 'Island Resort Sales'=>7}.

Next, at S265, column index 160 is updated to reflect the used columns. Continuing with the present example, 'Island Resort Sales'=>{'Country'=>4, 'Month'=>4, 'Year'=>6, 'Revenue'=>6, 'Number of Guests'=>3, Sales Person=>-2} may be updated to 'Island Resort Sales'=>{'Country'=>5, 'Month'=>5, 'Year'=>7, 'Revenue'=>7, 'Number of Guests'=>4, Sales Person=>-2}.

Figure 6:
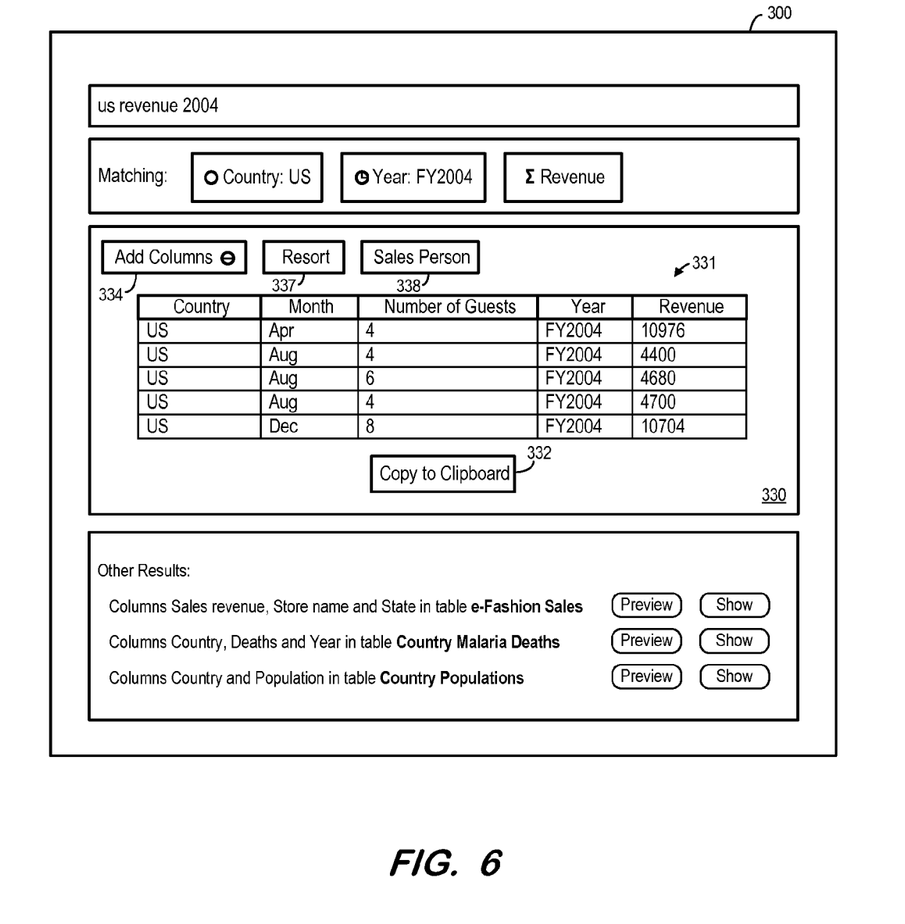

Flow may then return from S265 to S205 to receive another partial query from the user. According to the present embodiment, the user may select Add Columns control 334 to add columns to results 331. FIG. 6 illustrates interface 300 after selection of control 334. Specifically, area 330 now displays controls 337 and 338, selection of which will cause addition of their associated columns (i.e., Resort and Sales Person) from the dataset to results 331. Moreover, upon selection of control 332, column index 160 will be updated to reflect any added columns.

Figure 7:
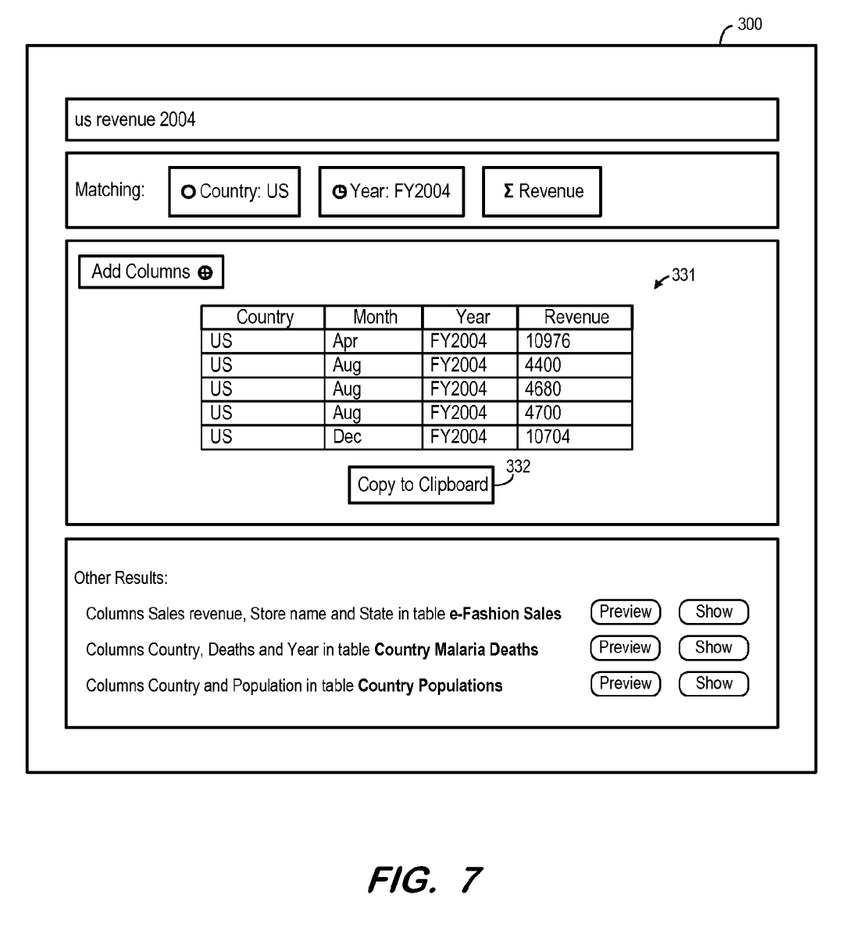

Alternatively, FIG. 7 illustrates results 331 after removal of the "Number of Guests" column. The user may instruct this removal using any suitable technique. In one example, the user "right-clicks" on the "Number of Guests" column and selects "Remove Column" from a resulting context menu. Again, upon selection of control 332 in FIG. 7, column index 160 is updated to reflect the deleted column. In contrast to the example described with respect to FIG. 5, the entry 'Island Resort Sales'=>{'Country'=>4, 'Month'=>4, 'Year'=>6, 'Revenue'=>6, 'Number of Guests'=>3, Sales Person=>-2} may be updated at S265 to 'Island Resort Sales'=>{'Country'=>5, 'Month'=>5, 'Year'=>7, 'Revenue'=>7, 'Number of Guests'=>2, Sales Person=>-2}.

The above-described example assumes that a user has entered a partial query for which corresponding query phrases are stored in prefix index 140. However, flow proceeds to S270 if no such query phrases are determined to exist at S210. Flow returns to S205 and again to S210 if the user continues to add characters to the partial query, and no query phrase suggestions are presented to the user during this time. Flow continues to S275 from S270 once the user indicates that the entered query phrase is complete (e.g., the user selects a Search control).

At S275, the input query phrase is simply run on data source 110 using conventional techniques. Results are received at S280 and presented at S285. The presented results may include several datasets and associated columns. Again, the dataset and columns that are "used" are determined at S250 and, if any, flow continues to S255 to update indices 140 through 160 based on the input query phrase, the used dataset and the used columns as described above.

According to some embodiments, indices 150 and 160 may be replaced with an index associating popular dataset/column combinations with query phrases. Specifically, the index may associate each query phrase with one or more datasets, and each of the one of more datasets with information indicating the popularity of its columns in the context of the query phrase. Such an index would be larger than the combination of above-described indices 150 and 160, but would provide an association between query phrases and columns which is not present in the above example.

Figure 8:
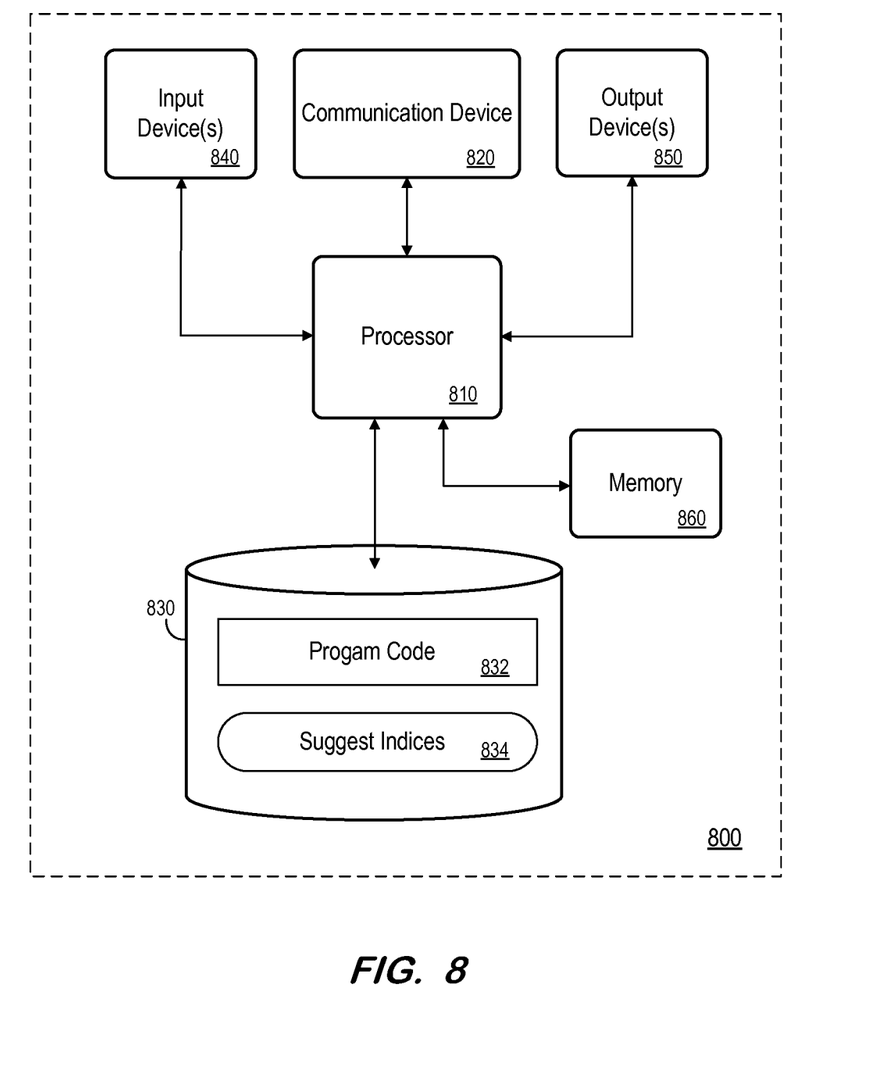
FIG. 8 is a block diagram of an apparatus according to some embodiments.

FIG. 8 is a block diagram of apparatus 800 according to some embodiments. Apparatus 800 may comprise a general-purpose computing apparatus and may execute program code to perform any of the functions described herein. Apparatus 800 may comprise an implementation of query server 130. Apparatus 800 may include other unshown elements according to some embodiments.

Apparatus 800 includes processor 810 operatively coupled to communication device 820, data storage device 830, one or more input devices 840, one or more output devices 850 and memory 860. Communication device 820 may facilitate communication with external devices, such as a reporting client, or a data storage device. Input device(s) 840 may comprise, for example, a keyboard, a keypad, a mouse or other pointing device, a microphone, knob or a switch, an infra-red (IR) port, a docking station, and/or a touch screen. Input device(s) 840 may be used, for example, to enter information into apparatus 800. Output device(s) 850 may comprise, for example, a display (e.g., a display screen) a speaker, and/or a printer.

Data storage device 830 may comprise any appropriate persistent storage device, including combinations of magnetic storage devices (e.g., magnetic tape, hard disk drives and flash memory), optical storage devices, Read Only Memory (ROM) devices, etc., while memory 860 may comprise Random Access Memory (RAM).

Program code 832 may be executed by processor 810 to cause apparatus 800 to perform any one or more of the processes described herein. Embodiments are not limited to execution of these processes by a single apparatus. Suggest indices 834 may include one or more indices and/or tables used to store information to perform processes as described herein. For example, suggest indices 834 may comprise indices 140 through 160 of FIG. 1. Data storage device 830 may also store data and other program code for providing additional functionality and/or which are necessary for operation thereof, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A non-transitory computer-readable medium storing program code, the program code executable by a processor of a computing system to cause the computing system to:
   receive a partial query;
   determine one or more previously-selected query phrases based on the partial query;
   for each of the one or more previously-selected query phrases, determine a dataset of a data source;
   for each dataset determined for each of the one or more previously-selected query phrases, determine a plurality of columns, each of the plurality of columns being associated with a respective popularity; and
   present, for each of the one or more previously-selected query phrases, the previously-selected query phrase, the dataset determined for the previously-selected query phrase, and the columns determined for the dataset.

2. A medium according to claim 1, the program code further executable by a processor of a computing system to cause the computing system to:
   receive a selection of one of the one or more presented previously-selected query phrases;
   execute the selected one query phrase on the dataset determined for the selected one query phrase;
   receive query results corresponding to the executed query phrase; and
   present the query results, wherein the presented query results comprise the columns determined for the dataset determined for the selected one query phrase.

3. A medium according to claim 2, the program code further executable by a processor of a computing system to cause the computing system to:
   receive an indication of further usage of a plurality of columns of the presented query results; and
   in response to indication,
      store a first association between the determined dataset and the further usage of the plurality of columns; and
      store a second association between the selected one query phrase and the determined dataset.

4. A medium according to claim 3, wherein the plurality of columns is a subset of the columns determined for the dataset.

5. A medium according to claim 3, wherein the columns determined for the dataset are a subset of the plurality of columns.

6. A medium according to claim 1, wherein determination of a dataset for each of the one or more previously-selected query phrases comprises:
   identification of a stored association between each of the one or more previously-selected query phrases and one or more respective datasets.

7. A medium according to claim 6, wherein determination of a plurality of columns for each of the one or more datasets comprises:
   identification of a stored association between each of the one or more datasets and a respective plurality of columns.

8. A computer-implemented method comprising:
receiving a partial query;
determining one or more previously-selected query phrases based on the partial query;
for each of the one or more previously-selected query phrases, determining a dataset of a data source;
for each dataset determined for each of the one or more previously-selected query phrases, determining a plurality of columns, each of the plurality of columns being associated with a respective popularity; and
presenting, for each of the one or more previously-selected query phrases, the previously-selected query phrase, the dataset determined for the previously-selected query phrase, and the columns determined for the dataset.

9. A method according to claim 8, further comprising:
receiving a selection of one of the one or more presented previously-selected query phrases;
executing the selected one query phrase on the dataset determined for the selected one query phrase;
receiving query results corresponding to the executed query phrase; and
presenting the query results, wherein the presented query results comprise the columns determined for the dataset determined for the selected one query phrase.

10. A method according to claim 9, further comprising:
receiving an indication of further usage of a plurality of columns of the presented query results; and
in response to indication,
storing a first association between the determined dataset and the further usage of the plurality of columns; and
storing a second association between the selected one query phrase and the determined dataset.

11. A method according to claim 10, wherein the plurality of columns is a subset of the columns determined for the dataset.

12. A method according to claim 10, wherein the columns determined for the dataset are a subset of the plurality of columns.

13. A method according to claim 8, wherein determining a dataset for each of the one or more previously-selected query phrases comprises:
identifying a stored association between each of the one or more previously-selected query phrases and one or more respective datasets.

14. A method according to claim 13, wherein determining a plurality of columns for each of the one or more datasets comprises:
identifying a stored association between each of the one or more datasets and a respective plurality of columns.

15. A system comprising:
a data storage device storing data;
a computing device comprising:
a memory storing processor-executable program code; and
a processor to execute the processor-executable program code in order to cause the computing device to:
receive a partial query;
determine one or more previously-selected query phrases based on the partial query;
for each of the one or more previously-selected query phrases, determine a dataset of a data source;
for each dataset determined for each of the one or more previously-selected query phrases, determine a plurality of columns, each of the plurality of columns being associated with a respective popularity; and
present, for each of the one or more previously-selected query phrases, the previously-selected query phrase, the dataset determined for the previously-selected query phrase, and the columns determined for the dataset.

16. A system according to claim 15, the processor to further execute the processor-executable program code in order to cause the computing device to:
receive a selection of one of the one or more presented previously-selected query phrases;
execute the selected one query phrase on the dataset determined for the selected one query phrase;
receive query results from the data storage device corresponding to the executed query phrase; and
present the query results, wherein the presented query results comprise the columns determined for the dataset determined for the selected one query phrase.

17. A system according to claim 16, the processor to further execute the processor-executable program code in order to cause the computing device to:
receive an indication of further usage of a plurality of columns of the presented query results; and
in response to indication,
store a first association between the determined dataset and the further usage of the plurality of columns; and
store a second association between the selected one query phrase and the determined dataset.

18. A system according to claim 17, wherein the plurality of columns is a subset of the columns determined for the dataset.

19. A system according to claim 17, wherein the columns determined for the dataset are a subset of the plurality of columns.

20. A system according to claim 15, wherein determination of a dataset for each of the one or more previously-selected query phrases comprises:
identification of a stored association between each of the one or more previously-selected query phrases and one or more respective datasets.

21. A system according to claim 20, wherein determination of a plurality of columns for each of the one or more datasets comprises:
identification of a stored association between each of the one or more datasets and a respective plurality of columns.

22. A non-transitory computer-readable medium storing program code, the program code executable by a processor of a computing system to cause the computing system to:
receive a partial query;
determine one or more previously-selected query phrases based on the partial query;
for each of the one or more previously-selected query phrases, determine a dataset of a data source;
for each dataset determined for each of the one or more previously-selected query phrases, determine a plurality of columns; and
present, for each of the one or more previously-selected query phrases, the previously-selected query phrase, the dataset determined for the previously-selected query phrase, and the columns determined for the dataset;
receive a selection of one of the one or more presented previously-selected query phrases;
execute the selected one query phrase on the dataset determined for the selected one query phrase;
receive query results corresponding to the executed query phrase; and present the query results, wherein the presented query results comprise the columns determined for the dataset determined for the selected one query phrase;
receive an indication of further usage of a plurality of columns of the presented query results; and
in response to indication,
    store a first association between the determined dataset and the further usage of the plurality of columns; and
store a second association between the selected one query phrase and the determined dataset.

23. A computer-implemented method comprising:
receiving a partial query;
determining one or more previously-selected query phrases based on the partial query;
for each of the one or more previously-selected query phrases, determining a dataset of a data source;
for each dataset determined for each of the one or more previously-selected query phrases, determining a plurality of columns;
presenting, for each of the one or more previously-selected query phrases, the previously-selected query phrase, the dataset determined for the previously-selected query phrase, and the columns determined for the dataset;
receiving a selection of one of the one or more presented previously-selected query phrases;
executing the selected one query phrase on the dataset determined for the selected one query phrase;
receiving query results corresponding to the executed query phrase;
presenting the query results, wherein the presented query results comprise the columns determined for the dataset determined for the selected one query phrase;
receiving an indication of further usage of a plurality of columns of the presented query results; and
in response to indication,
    storing a first association between the determined dataset and the further usage of the plurality of columns; and
    storing a second association between the selected one query phrase and the determined dataset.

24. A system comprising:
a data storage device storing data;
a computing device comprising:
    a memory storing processor-executable program code; and
    a processor to execute the processor-executable program code in order to cause the computing device to:
    receive a partial query;
    determine one or more previously-selected query phrases based on the partial query;
    for each of the one or more previously-selected query phrases, determine a dataset of a data source;
    for each dataset determined for each of the one or more previously-selected query phrases, determine a plurality of columns;
    present, for each of the one or more previously-selected query phrases, the previously-selected query phrase, the dataset determined for the previously-selected query phrase, and the columns determined for the dataset;
    receive a selection of one of the one or more presented previously-selected query phrases;
    execute the selected one query phrase on the dataset determined for the selected one query phrase;
    receive query results from the data storage device corresponding to the executed query phrase;
    present the query results, wherein the presented query results comprise the columns determined for the dataset determined for the selected one query phrase;
    receive an indication of further usage of a plurality of columns of the presented query results; and
    in response to indication,
        store a first association between the determined dataset and the further usage of the plurality of columns; and
        store a second association between the selected one query phrase and the determined dataset.

* * * * *